United States Patent [19]

Takakusagi et al.

[11] Patent Number: 4,997,274

[45] Date of Patent: Mar. 5, 1991

[54] THREE-DIMENSIONAL MEASUREMENT APPARATUS

[75] Inventors: Tsunehiko Takakusagi; Masahiro Yoshida; Masami Harano; Joshiro Sato, all of Hitachi; Tadao Nakaya, Utsunomiya, all of Japan

[73] Assignees: Hitachi, Ltd.; Mitutoyo Corp., both of Tokyo, Japan

[21] Appl. No.: 243,602

[22] Filed: Sep. 13, 1988

[30] Foreign Application Priority Data

Sep. 17, 1987 [JP] Japan .................... 62-233314

[51] Int. Cl.$^5$ .................... G01B 11/24; G01B 5/20
[52] U.S. Cl. .................... 356/72; 356/376; 33/503
[58] Field of Search ............ 356/375, 376, 358, 359, 356/360, 72; 33/503, 551

[56] References Cited

FOREIGN PATENT DOCUMENTS

| 177038 | 4/1986 | European Pat. Off. |
| 3117795 | 4/1982 | Fed. Rep. of Germany |
| 3241710 | 5/1984 | Fed. Rep. of Germany |
| 3502388 | 9/1985 | Fed. Rep. of Germany |
| 3601910 | 7/1987 | Fed. Rep. of Germany ........ 33/555 |
| 60-205306 | 10/1985 | Japan |
| 63-47606 | 2/1988 | Japan .................... 356/376 |
| 1506659 | 4/1978 | United Kingdom |
| 2184891 | 7/1987 | United Kingdom |

Primary Examiner—F. L. Evans
Attorney, Agent, or Firm—Antonelli, Terry, Stout & Kraus

[57] ABSTRACT

A three-dimensioinal measurement apparatus has a detecting sensor for measuring a distance to an object having a three-dimensional shape, which detecting sensor is comprised of a non-contact type detecting sensor or a probe type detecting sensor, a drive mechanism arranged to drive the detecting sensor and having orthogonal coordinates constituted by three orthogonal X, Y and Z axes, a control section for controlling an amount of driving provided by the drive mechanism on the basis of predetermined input information and for converting a measured distance provided by the detecting sensor into distance information corresponding to a required coordinate system and outputting the distance information thus converted, and a mounting device for detachably mounting the detecting sensor to a predetermined position. The non-contact type detecting sensor and the probe type detecting sensor are used, as required, while either of them is switched to the other. The mounting device includes an intermediate adapter secured to a Z-axis spindle of the drive mechanism, a mounting shaft associated with the detecting sensor, and a detachable nut for detachably mounting the mounting shaft to the intermediate adapter.

14 Claims, 6 Drawing Sheets

THREE-DIMENSIONAL MEASUREMENT APPARATUS

BACKGROUND OF THE INVENTION

1. Field of the Invention

The present invention relates generally to three-dimensional measurement apparatus and, more particularly, to a three-dimensional measurement apparatus in which it is possible to use a non-contact type detecting sensor and a probe type detecting sensor, as required, while switching either of them to the other.

2. Description of the Related Art

Probe type three-dimensional measurement apparatus are commonly used to measure dimensions of mechanical components or the like. Such a measurement apparatus is arranged to provide a measure of an object while keeping the probe of a probe type detecting sensor in direct contact with the object.

Such a probe type three-dimensional measurement apparatus which relies upon the related art can be used to measure an object having a mirror plane or dimensions of an object having a definite shape (such as a cube or a column) which requires critical measurement accuracy. Such a conventional probe type three-dimensional measurement apparatus, however, presents the following problems. For example, since it is necessary to compensate for the diameter of the probe with respect to the inclination of each measuring surface of an object, it is difficult to apply such a probe type measurement apparatus to measurement of a three-dimensional free-curved surfaces, that is, the measurement of the shape of an object having three-dimensional free-curved surfaces. There is a risk of damaging or deforming an object during measurement. Also, it is difficult to increase speeds of measurement.

In recent years, non-contact type three-dimensional measurement apparatus have been developed. This type of measurement apparatus typically employs, in place of the probe of the probe type detecting sensor, a light-spot-position detecting sensor which is a non-contact type detecting sensor arranged to measure a distance to an object in a non-contact manner by illuminating the object with a laser beam. In this type of detecting sensor, the laser beam emitted from a light source illuminates the object, and a portion of reflected light is passe through a lens system to reach a detector for detecting the position of the object. If the object is moved toward or away from the laser probe, reflected light reaches a different point on the detector surface, which point differs from the point upon which the reflected light fell prior to the movement of the object. This positional change is subjected to electrical signal processing, whereby a distance to the object is measured. The range in which the positional change can be measured is small, for example 32 mm. Such a non-contact type three-dimensional measurement apparatus is disclosed in Japanese Patent Unexamined Publication No. 60-20530.

The above-described conventional non-contact type three-dimensional measurement apparatus employing the light-spot-position detecting sensor does not involve the aforementioned problems which are presented by the probe type three-dimensional measurement apparatus. Accordingly, it is possible to perform high-speed measurement of the shape of an three-dimensional free-curved-surface object and measurement of the shape of a soft object However, the conventional non-contact type three-dimensional measurement apparatus involves the following problems. That is, the non-contact type apparatus is generally inferior in measurement accuracy to the probe type apparatus because of specific phenomena derived from the reflection of a laser beam. Also, it has been impossible to measure an object having a mirror plane such as a glass plate.

SUMMARY OF THE INVENTION

It is, therefore, an object of the present invention to provide a three-dimensional measurement apparatus which has the advantageous features of both probe type and non-contact type measurement apparatus so that the above-described problems involved in the related art can be solved.

To achieve the above and other objects, in accordance with the present invention, there is provided a three-dimensional measurement apparatus whose detecting sensor is constituted by a non-contact detecting sensor and/or a probe type detecting sensor so that they can be used, as required, while switching either of them to the other and which is provided with mounting means for mounting the detecting sensor to the apparatus at a predetermined location thereof.

The above and other objects, features and advantages of the present invention will become apparent from the following description of the preferred embodiments thereof, taken in conjunction with the accompanying drawings.

DESCRIPTION OF THE DRAWINGS

FIG. 4b is a vertical sectional view taken along the line IVb—IVb of FIG. 4a;

DESCRIPTION OF THE PREFERRED EMBODIMENT

FIGS. 1-2, 3a-3b, 4a-4b and 5-6 show a three-dimensional measurement apparatus according to a preferred embodiment of the present invention.

Figure 6:
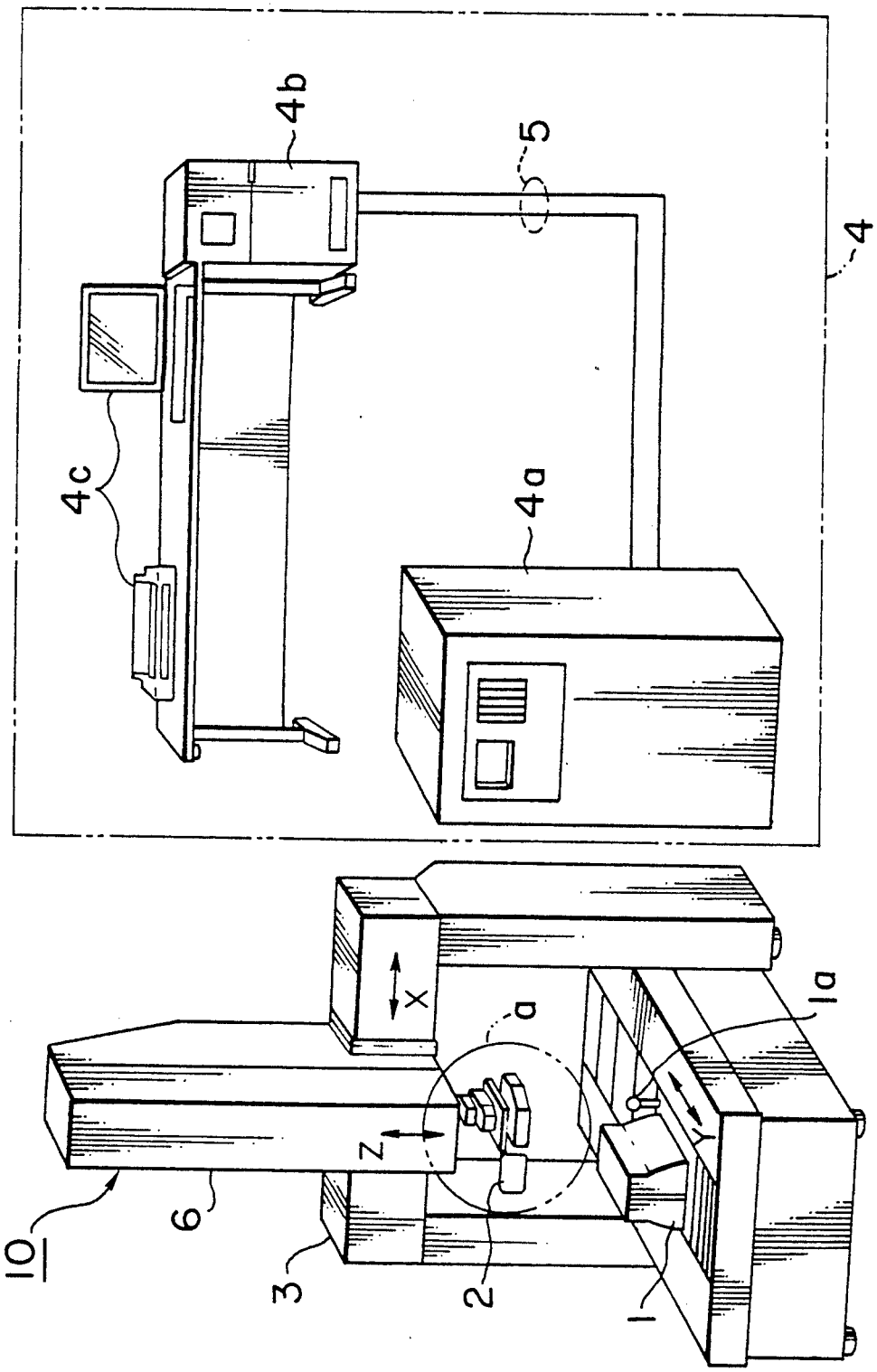
FIG. 6 is a bird's-eye view showing the layout of the primary components of the three-dimensional measuring apparatus to which the present invention is applied.

As shown in FIG. 6, a three-dimensional measurement apparatus indicated generally at 10 includes a detecting sensor 2 for measuring a distance to an object 1 having a three-dimensional shape, a drive mechanism 3 arranged to drive the detecting sensor 2 and having orthogonal coordinates consisting of three orthogonal X, Y and Z axes, and a control section 4 for controlling an amount of driving provided by the drive mechanism 3 on the basis of predetermined input information and for converting a measured distance provided by the detecting sensor 2 into distance information corresponding to a required coordinate system and outputting the distance information thus converted. The control section 4 includes a control device 4a for driving and controlling the drive mechanism 3, an arithmetic and storage device 4b, an input/output device 4c and a communication cable 5 for connecting the control device 4a and the arithmetic and storage device 4b. The arithmetic and storage device 4b has a signal converting unit, an arithmetic unit, a storage unit, and internal file unit and their associated components (none of which is shown) for the purpose of performing arithmetic operations upon a measured distance provided by the detecting sensor 2 to convert it into distance information according to the required coordinate system, storing these input values and measured distance, and outputting them as required.

The detecting sensor 2 is constituted by a non-contact type detecting sensor 2a and/or a probe type detecting sensor 2b, and is detachably mounted to a Z-axis spindle 6 of the drive mechanism 3 by means of a mounting means which will be described later. The mounting means is altered in construction, mounting procedure and mounting accuracy depending upon whether the non-contact type detecting sensor 2a or the probe type detecting sensor 2b is to be mounted.

If the object 1 (refer to FIG. 6) is to be measured by the probe type detecting sensor 2b, prior to measurement, an origin block 1a (refer to FIG. 6) which is mounted on the drive mechanism 3 is measured by means of the probe type detecting sensor 2b to perform an operation (the linkage of coordinate systems) for causing the coordinates of a probe 27 (refer to FIG. 5) of the probe type detecting sensor 2b to correspond with the coordinates of the drive mechanism 3. The origin of the probe 27 which has thus been obtained is not changed until the relevant measurement is completed. Since such an operation is performed prior to each measurement, measurement accuracy is not affected by the state of mounting of the probe type detecting sensor 2b. Accordingly, there is no substantial problem even if the state of mounting of the probe type detecting sensor 2b to the Z-axis spindle 6 of the drive mechanism 3 varies for each mounting. Therefore, excessive mounting accuracy is not needed.

On the other hand, if the object 1 is to be measured by means of the non-contact type detecting sensor 2a, it is necessary to measure the object 1 while varying the angles of rotation and inclination of a sensor probe 19 (refer to FIG. 1) of the non-contact type detecting sensor 2a. It is impossible, therefore, to perform the above-described operation (the linkage of the coordinate systems) of matching the origin of the sensor probe 19 with that of the drive mechanism 3 as in the case of the probe type detecting sensor 2b. For this reason, it is required that the origin adjustment of the coordinate system be performed each time the non-contact type detecting sensor 2a is mounted to the Z-axis spindle 6 of the drive mechanism 3. However, since this origin adjustment operation requires skilled and time-consuming work, it is difficult, in practice, for a user to perform such an operation each time the non-contact type detecting sensor 2a is mounted. For this reason, in accordance with the present invention, the origin adjustment of each coordinate system is beforehand performed by a manufacturer, and the mounting means is constructed such that the state of mounting of the non-contact type detecting sensor 2a in the origin adjustment can always be reproduced at the time of replacement of detecting sensors. Therefore, the non-contact type detecting sensor 2a is mounted to the Z-axis spindle 6 so that an optical axis 24 of the non-contact type detecting sensor 2a may exactly coincide with the Z-axis coordinate system of the drive mechanism 3 and so that an inclination axis 25 of the sensor probe 19 may exactly perpendicularly intersect the optical axis 24 at an intersection point. In this fashion, in accordance with the present invention, there has been provided a three-dimensional measurement apparatus having the features of both the probe type detecting sensor and the non-contact type detecting sensor.

The above-described mounting means is constituted by an intermediate adapter 7 which is secured to the Z-axis spindle 6 of the drive mechanism 3 by means of a plurality of bolts 6a, a mounting shaft 8 for the non-contact type detecting sensor 2a and/or a mounting shaft 9 for the probe-type detecting sensor 2b. Each of the mounting shafts 8 and 9 is detachably mounted to the intermediate adapter 7 by means of a detachable mounting nut 11. Thus, the intermediate adapter 7, the mounting shaft 8 and the detachably mounting nut 11 constitute the mounting means for mounting the non-contact type detachable sensor 2a to the apparatus, while the intermediate adapter 7, the mounting shaft 9 and the detachably mounting nut 11 constitute the mounting means for mounting the probe type detecting sensor 2b to the apparatus.

The Z-axis spindle 6 of the drive mechanism 3 is arranged to move up and down in the Z-axis direction by the driving of a Z-axis driving motor (not shown), and the intermediate adapter 7 is secured to one end of the Z-axis spindle 6 by means of the plurality of bolts 6a.

Figure 3A:
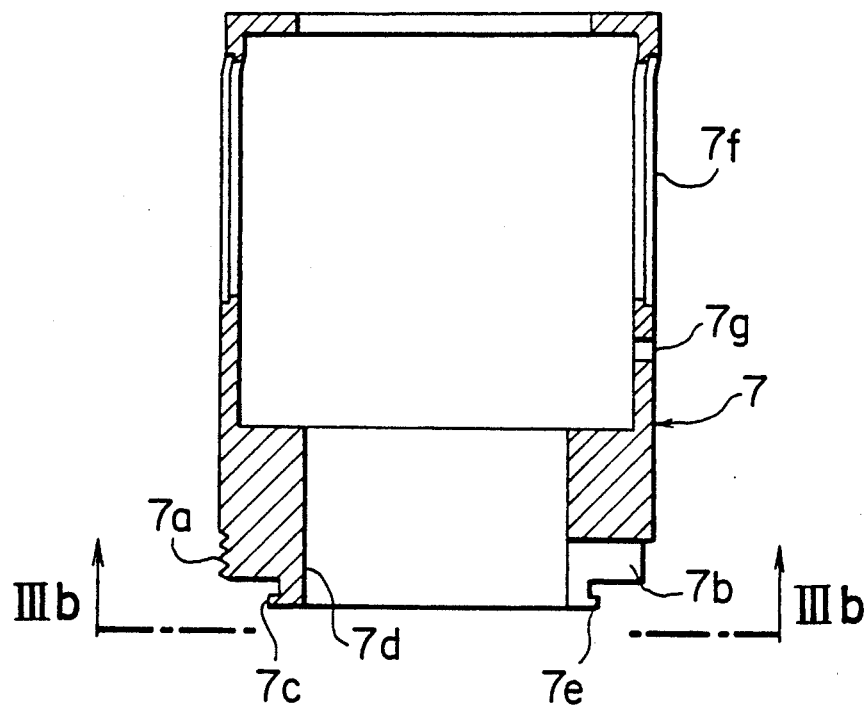
FIG. 3a is a vertical sectional view of an intermediate adapter for use in the embodiment of the present invention.
Figure 3B:
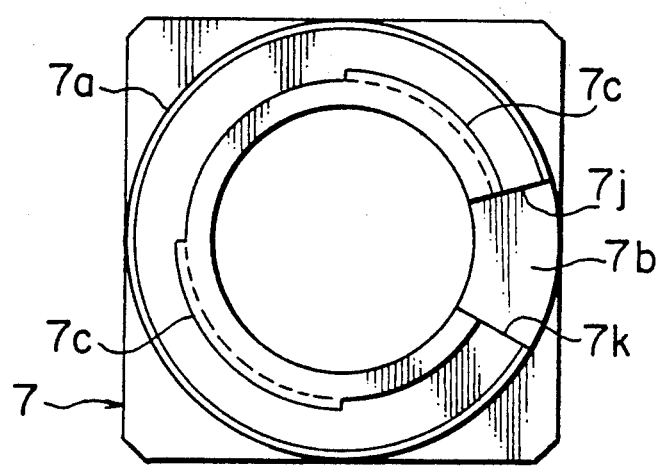
FIG. 3b is a front elevational view of the intermediate adapter for use in the embodiment of the present invention.

As shown in each of FIGS. 3a and 3b, the intermediate adapter 7 is formed with an externally threaded portion 7a which is provided around the external periphery adjacent to the lower end of the intermediate adapter 7, a sector-shaped cutout 7b formed in the bottom portion of the same, and a pair of rims 7c which each extend in an arcuate form to oppose each other in the diametrical direction. Furthermore, the intermediate adapter 7 is formed with windows 7f in which covers 22 are respectively mounted and a hole 7g in which a cable connector 18 is mounted. The externally threaded portion 7a of the intermediate adapter 7 is screwed into the detachable mounting nut 11. The intermediate adapter 7 has a cylindrical internal surface 7d which is exactly coaxial with the Z-axis and a bottom surface 7e for defining the heightwise position of the non-contact type detecting sensor 2a. The cutout 7b has reference surfaces 7j and 7k which serve to accurately determine the position of the non-contact type detecting sensor 2a with respect to the direction of rotation about the Z axis.

Figure 1:
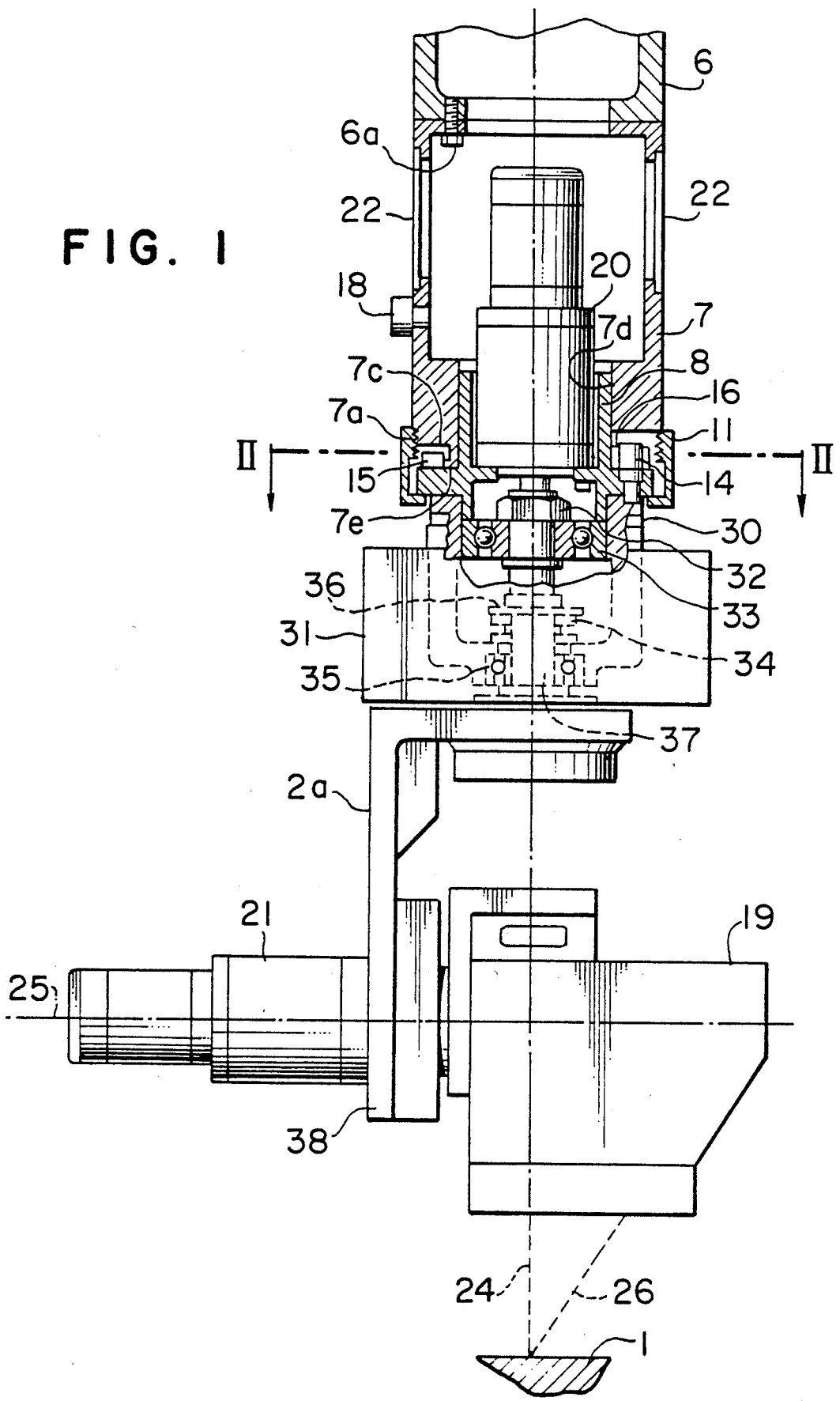
FIG. 1 is a diagrammatic vertical sectional view taken along the line I—I of FIG. 2, and illustrates a non-contact type detecting sensor for use in a three-dimensional measurement apparatus according to one embodiment of the present invention and the arrangement in which the non-contact type detecting sensor is mounted to the same.
Figure 2:
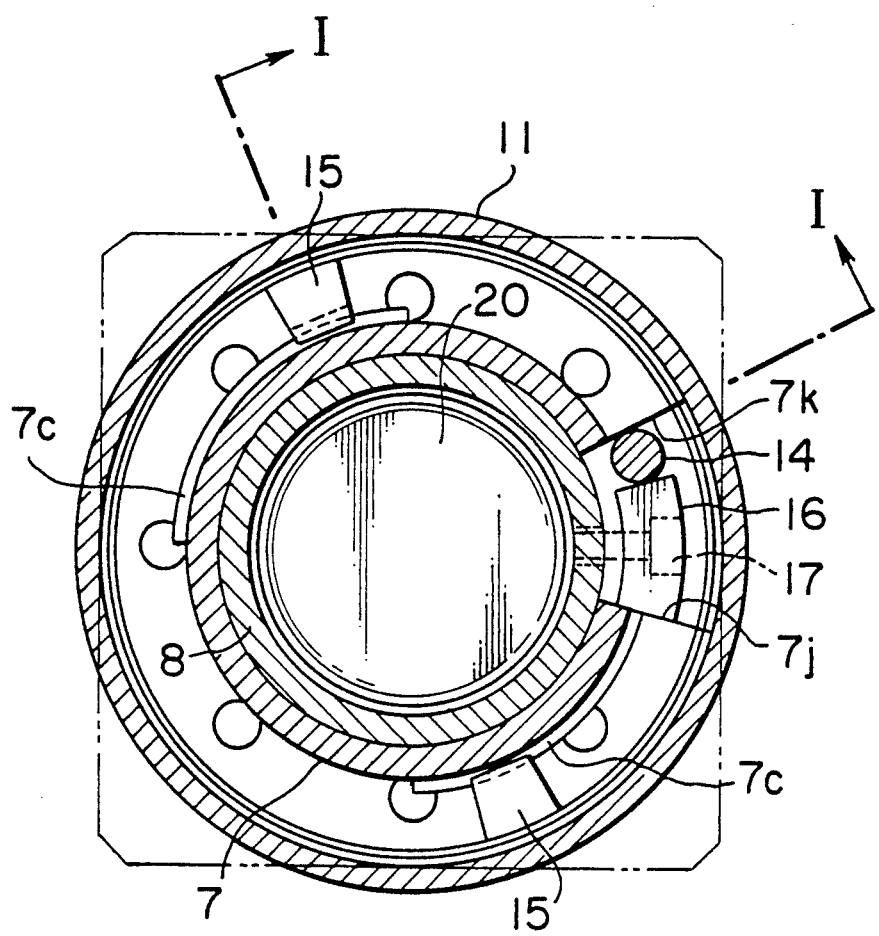
FIG. 2 is a horizontal sectional view taken along the line II—II of FIG. 1.

FIGS. 1 and 2 show the non-contact type detecting sensor 2a and the mounting means for mounting it. The non-contact type detecting sensor 2a is provided with the sensor probe 19, a motor 20 for rotating the sensor probe 19 about the Z axis, a motor 21 for rotating the sensor probe 19 about the horizontal inclination axis 25, and a connecting mechanism for connecting the motors 20 and 21 with the sensor probe 19. The connecting mechanism includes a case 30 mounted to the mounting shaft 8, a cover 31 which surrounds the case 30, a rotary shaft 37 connected to the output shaft of the motor 20, a nut 32 and a bearing stopper 36 for restricting the rotary shaft 37 with respect to the direction of the axis thereof, bearings 33, 34 and 35 for guiding the rotary shaft 37 and a bracket 38 for coupling the rotary shaft 37 to the motor 21. In FIG. 1, reference numeral 26 denotes the axis of receiving light.

Figure 4A:
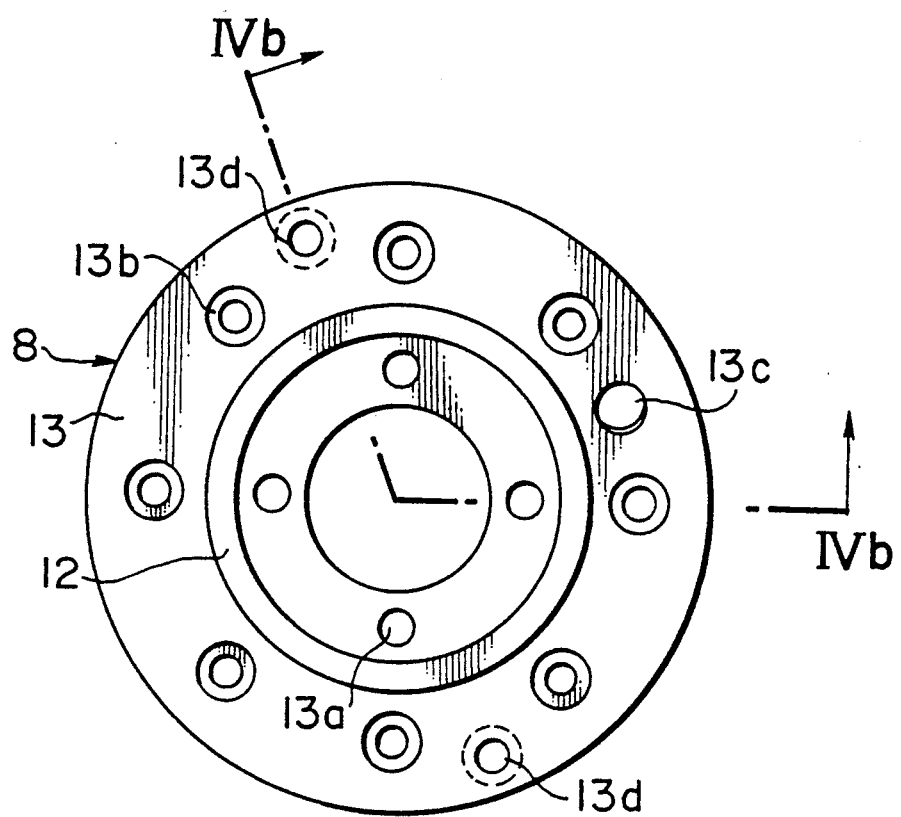
FIG. 4a is a plan view of a mounting shaft for mounting the non-contact type detecting sensor of FIG. 1.
Figure 4B:
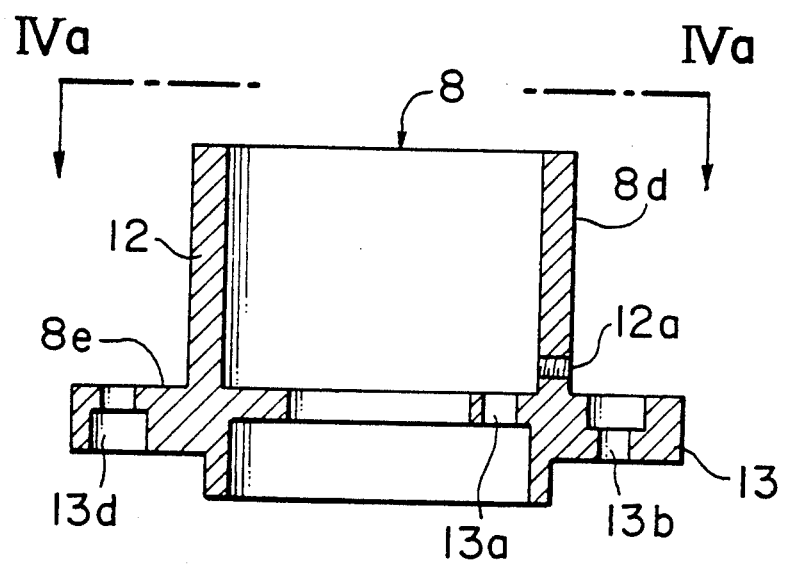

As shown in FIGS. 4a and 4b, the mounting shaft 8 for the non-contact type detecting sensor 2a is constituted by a cylindrical portion 12 and a flange portion 13. The cylindrical portion 12 has an internally threaded hole 12a into which a fixing bolt 17 is screwed for fixing a positioning block 16 which will be described later. The flange portion 13 has a plurality of through-holes 13a for receiving bolts for mounting the motor 20 to the flange portion 13 and a plurality of stepped through-holes 13b for receiving bolts for fixing the case 30 to the mounting shaft 8. As shown in FIGS. 1 and 2, a reference pin 14, securing pieces 15 and a positioning block 16 are attached to the mounting shaft 8. The reference pin 14 is press fitted into a hole 13c formed in the flange portion 13 of the mounting shaft 8. The respective securing pieces 15 are fixed in a pair of stepped through-holes 13d which are formed in the flange portion 13 of the mounting shaft 8 such that they oppose each other in the diametrical direction. The positioning block 16 is fixed to the mounting shaft 8 by screwing a fixing bolt 17 into the internally threaded hole 12a formed in the cylindrical portion 12 of the mounting shaft 8. It is to be noted that, as will be described in detail later, when the non-contact type detecting sensor 2a is to be mounted, the positioning block 16 is fixed to the mounting shaft 8 prior to screwing the detachable mounting nut 11 onto the external threaded portion 7a of the intermediate adapter 7, but when the non-contact type detecting sensor 2a is to be removed, the positioning block 16 is removed from the mounting shaft 8 after the detachable mounting nut 11 has been removed from the external threaded portion 7a of the intermediate adapter 7. The cylindrical portion 12 of the mounting shaft 8 for mounting the non-contact type detecting sensor 2a has a cylindrical external surface 8d which is exactly coaxial with the Z axis of the non-contact type detecting sensor 2a, and the cylindrical external surface 8d of the mounting shaft 8 is fitted into the cylindrical internal surface 7d of the intermediate adapter 7. The flange portion 13 has a top surface 8e which is to be maintained in contact with the bottom surface 7e of the intermediate adapter 7 to define the heightwise position of the non-contact type detecting sensor 2a.

Referring to FIG. 1, if a cable connector of the non-contact type detecting sensor 2a is connected to the cable connector 18 of the intermediate adapter 7 when using the non-contact type detecting sensor 2a, a circuit and a sensor measuring circuit (neither of which is shown) for driving the non-contact type detecting sensor 2a while controlling the rotation and inclination thereof are activated and, at the same time, a detecting-sensor recognizing circuit (not shown) conducts to transmit a signal to the control section 4 (refer to FIG. 6). However, when the probe type detecting sensor 2b (refer to FIG. 5) is in use, even if the cable connector thereof is connected to the cable connector 18, the detecting-sensor recognizing circuit does not conduct.

A plurality of cable connectors 18 may be provided as required.

The procedures for mounting the non-contact type detecting sensor 2a will be described below with reference to FIGS. 1 and 2.

First, the cylindrical internal surface 7d of the intermediate adapter 7 is exactly fitted onto the cylindrical external surface 8d of the mounting shaft 8. Thus, the Z axis of the drive mechanism 3 and the axis normal thereto exactly correspond to the axis of the non-contact type detecting sensor 2a and the axis normal thereto, respectively. In this case, the positioning block 16 is beforehand removed so that the securing pieces 15 which are fixed to the mounting shaft 8 for temporarily securing the non-contact type detecting sensor 2a may not interfere with the rims 7c of the intermediate adapter 7. The mounting shaft 8 is inserted into the intermediate adapter 7 after the mounting shaft 8 has been rotated clockwise as viewed in FIG. 2 until the securing pieces 15 are removed from the rims 7c of the intermediate adapter 7, that is, until the reference pin 14 mounted to the mounting shaft 8 comes into contact with a reference surface 7j of the intermediate adapter 7. The top of the cylindrical portion 12 of the mounting shaft 8 is preferably tapered so that the mounting shaft 8 may be readily inserted into the intermediate adapter 7. After the insertion of the mounting shaft 8 into the intermediate adapter 7 has been substantially completed, the mounting shaft 8 is rotated counterclockwise as viewed in FIG. 2 to such an extent that the reference pin 14 comes into contact with the reference surface 7k of the intermediate adapter 7. Thus, the whole of the non-contact type detecting sensor 2a is temporarily secured to the intermediate adapter 7 by the engagement of the rims 7c of the intermediate adapter 7 with the securing pieces 15 of the mounting shaft 8. Second, the positioning block 16 is inserted between the reference pin 14 fixed to the mounting shaft 8 and the reference surface 7j of the intermediate adapter 7. Then, the positioning block 16 is fixed to the mounting shaft 8 by means of the fixing bolt 17, whereby the positional relationship between the intermediate adapter 7 and the mounting shaft 8 is exactly fixed with respect to the direction of rotation about the Z axis. Then, the detachable mounting nut 11 of the non-contact type detecting sensor 2a is screwed onto the externally threaded portion 7a of the intermediate adapter 7 to a point at which the bottom surface 7e of the intermediate adapter 7 is brought into contact with the corresponding upper surface 8e of the flange portion 13 of the mounting shaft 8. Thus, the heightwise position of the intermediate adapter 7 is determined and similarly the heightwise position of the non-contact type detecting sensor 2a is fixed. Finally, the cable connector of the non-contact type detecting sensor 2a is connected to the cable connector 18 of the intermediate adapter 7 so as to activate the circuit and the sensor measuring circuit for driving the non-contact type detecting sensor 2a while controlling the rotation and inclination thereof and, at the same time, to supply electricity to the detecting-sensor recognizing circuit to cause the same to transmit a signal to the control section 4 (refer to FIG. 6). It is to be noted that the non-contact type detecting sensor 2a is constructed such that the optical axis 24 of light which illuminates the sensor 19 may exactly coincide with the axis of the mounting shaft 8 and so that the inclination axis 25 of the sensor 19 may exactly perpendicularly intersect the optical axis 24 at an intersection point.

When the non-contact detecting sensor 2a is to be removed, first, the cable connector of the detecting sensor 2a is removed from the cable connector 18 of the intermediate adapter 7. The subsequent procedures are performed in the order reverse to the mounting procedures described above.

Figure 5:
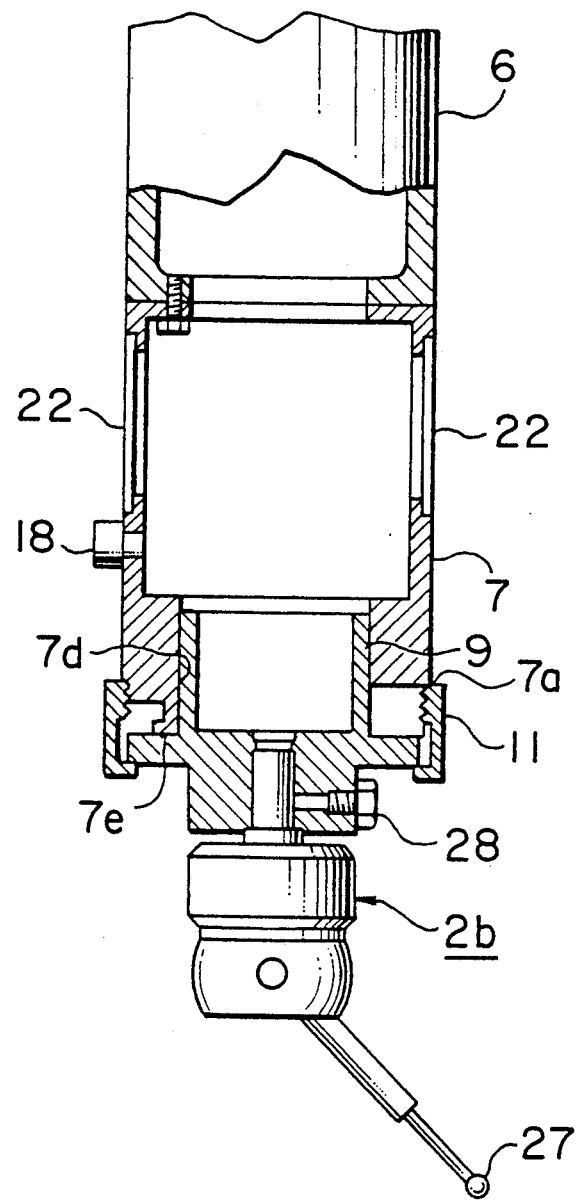
FIG. 5 is a fragmentary diagrammatic view, in partially vertical section, illustrating a probe type detecting sensor for use in the above embodiment of the present invention and the arrangement in which the probe type detecting sensor is mounted to the same.

FIG. 5 shows the mounting means for the probe type detecting sensor 2b. In the case of the probe type detecting sensor 2b, the portion of the mounting shaft 9 to be fitted into contact with the cylindrical internal surface 7d of the intermediate adapter 7 does not need the mounting accuracy required for mounting the cylindrical external surface 8d of the mounting shaft 8 for the non-contact type detecting sensor 2a. In FIG. 5, reference numeral 28 denotes a bolt for detachably mounting different probe type detecting sensors 2b to mounting shaft 9 and reference numeral 11 denotes a detachable mounting nut for detachably mounting the probe type detecting sensor 2b to the intermediate adapter 7. It is not necessary for the mounting means for the probe type detecting sensor 2b to be provided with any positioning means which serves for positioning the sensor with respect to the direction of rotation about the Z axis (the reference surfaces 7j and 7k, the reference pin 14, the positioning block 16 or the fixing bolt 17 (refer to FIGS. 1 and 2) and is required in the mounting means for the non-contact type detecting sensor 2a nor any temporarily securing means (the securing pieces 14 (refer to FIG. 1)) which is temporarily secured to the intermediate adapter 7, although either of them is required by the mounting means for the non-contact type detecting sensor 2a. The reason for this is: (1), before the object 1 is measured by the probe type detecting sensor 2b, the origin block 1a (refer to FIG. 6) mounted to the drive mechanism 3 is measured by the probe type detecting sensor 2b, irrespective of the state of mounting of the probe type detecting sensor 2b, to cause the coordinates of the probe 27 of the probe type detecting sensor 2b to correspond to the coordinates of the drive mechanism 3 (the linkage of the coordinate systems) and (2) the origin of the probe 27 which has thus been obtained is not varied until the relevant measurement is completed. Also, since the probe type detecting sensor 2b is substantially light compared with the non-contact type detecting sensor 2a, the temporarily securing means used with the non-contact type detecting sensor 2a, that is, the securing pieces 14 (refer to FIG. 2) is not needed (although there is no problem even if they are mounted).

The procedures for mounting the probe type detecting sensor 2b will be described below with reference to FIG. 5. First, the mounting shaft 9 of the probe type detecting sensor 2b is inserted into the intermediate adapter 7 with the cylindrical external surface of the mounting shaft 9 in contact with the cylindrical internal surface 7d. Second, the detachable mounting nut 11 is screwed onto the externally threaded portion 7a of the intermediate adapter 7 until the bottom surface 7e of the intermediate adapter 7 comes into contact with the corresponding flange portion of the mounting shaft 9, whereby the heightwise position of the probe type detecting sensor 2b is determined. Finally, the cable connector of the detecting sensor 2b is connected to the cable connector 18 of the intermediate adapter 7.

When the probe type detecting sensor 2b thus mounted is to be removed, first, the cable connector of the detecting sensor 2b is removed from the cable connector 18 of the intermediate adapter 7. The subsequent procedures are performed in the order reverse to the mounting procedures described above.

In the presently preferred embodiment, by way of example, the intermediate adapter 7 which is prepared separately from the Z-axis spindle 6 is attached to the Z-axis spindle 6. The present invention is not limited to such an arrangement and the intermediate adapter 7 may of course be formed integral with the Z-axis spindle 6.

It will be appreciated from the foregoing that, in accordance with the present invention, it is possible to perform various kinds of measurement of objects of any shape such as high-precision measurement of the dimensions of an object having a definite shape, measurement of an object having a mirror plane, high-speed measurement of the shape of an object composed of three-dimensional free curved surfaces, measurement of the shape of a soft object, and measurement of a composite object having definitely shaped portions which require high-precision dimension measurement and three-dimensional free-curved-surface portions which require high-speed shape measurement.

What is claimed is:

1. A three-dimensional measurement apparatus including a detecting sensor for measuring a distance to an object having a three-dimensional shape, a drive mechanism arranged to drive said detecting sensor and having orthogonal coordinates constituted by three orthogonal X, Y and Z axes, and a control section for controlling an amount of driving provided by said drive mechanism on the basis of predetermined input information, for converting a measured distance provided by said detecting sensor into distance information corresponding to a required coordinate system, and for outputting said distance information thus converted, wherein the improvement comprises mounting means for detachably mounting said detecting sensor to a predetermined location, said detecting sensor including one of a non-contact type detecting sensor and a probe type detecting sensor, as required, for detachable and interchangeable mounting by said mounting means, wherein said detecting sensor is a non-contact type detecting sensor having an optical axis, said non-contact type detecting sensor being mounted to a Z-axis spindle of said drive mechanism by means of said mounting means such that said optical axis of said non-contact type detecting sensor corresponds to a Z-axis coordinate system of said drive mechanism.

2. A three-dimensional measurement apparatus including a detecting sensor for measuring a distance to an object having a three-dimensional shape, a drive mechanism arranged to drive said detecting sensor and having orthogonal coordinates constituted by three orthogonal X, Y and Z axes, and a control section for controlling an amount of driving provided by said drive mechanism on the basis of predetermined input information, for converting a measured distance provided by said detecting sensor into distance information corresponding to a required coordinate system, and for outputting said distance information thus converted, wherein the improvement comprises mounting means for detachably mounting said detecting sensor to a predetermined location, said detecting sensor including one of a non-contact type detecting sensor and a probe type detecting sensor, as required, for detachable and interchangeable mounting by said mounting means, wherein said mounting means includes a mounting shaft associated with said detecting sensor, and a detachable nut for detachably mounting said mounting shaft to a predetermined location.

3. A three-dimensional measurement apparatus according to claim 2, wherein said mounting means further includes an intermediate adapter which is secured to a Z-axis spindle of said drive mechanism, said mounting shaft being detachably mounted to said intermediate adapter by screwing said detachable nut onto an externally threaded portion formed around an external peripheral portion of said intermediate adapter.

4. A three-dimensional measurement apparatus according to claim 3, wherein said detecting sensor is a noncontact type detecting sensor having an optical axis, said noncontact type detecting sensor being mounted to said Z-axis spindle of said drive mechanism by means of said mounting means such that the optical axis of said non-contact type detecting sensor corresponds to a Z-axis coordinate system of said drive mechanism.

5. A three-dimensional measurement apparatus according to claim 4, wherein said mounting means further comprises temporarily securing means and positioning means.

6. A three-dimensional measurement apparatus according to claim 5, wherein said temporarily securing means includes securing pieces formed at one of said intermediate adapter and said mounting shaft, and rims formed at the other, said mounting shaft being temporarily secured to said intermediate adapter by engaging said securing pieces with said rims.

7. A three-dimensional measurement apparatus according to claim 6, wherein said positioning means comprises a centering portion for aligning the optical axis of said non-contact type detecting sensor with an axis of said Z-axis spindle of said drive mechanism, a leveling portion for determining a heightwise position of said non-contact type detecting sensor, and means for determining a position of said non-contact type detecting sensor with respect to a direction of rotation thereof about the axis of said Z-axis spindle of said drive mechanism.

8. A three-dimensional measurement apparatus according to claim 7, wherein said centering portion is comprised of a cylindrical internal periphery of said intermediate adapter and an cylindrical external periphery of said mounting shaft.

9. A three-dimensional measurement apparatus according to claim 8, wherein said leveling portion is comprised of a bottom portion of said intermediate adapter which perpendicularly intersects an axis of said cylindrical internal periphery of said intermediate adapter, and a flange portion of said mounting shaft which perpendicularly intersects said cylindrical external periphery of said mounting shaft.

10. A three-dimensional measurement apparatus according to claim 9, wherein said means for determining the position of said non-contact type detecting sensor with respect to the direction of rotation thereof comprises a radially extending surface defined by a cutout formed in said intermediate adapter, a reference pin fixed to said mounting shaft, and a positioning block detachably secured to said mounting shaft by means of a bolt.

11. A three-dimensional measurement apparatus according to claim 3, wherein said detecting sensor is a probe type detecting sensor selected from a plurality of different probe type detecting sensors, each of said different probe type detecting sensor being detachably mountable to said mounting shaft by means of a bolt.

12. A method of detachably mounting a detecting sensor to a three-dimensional measurement apparatus, said detecting sensor being comprised of one of a non-contact type detecting sensor and a probe type detecting sensor which can be selectively used, as required, by interchangeable mounting thereof, said detecting sensor being arranged to measure a distance to an object having a three-dimensional shape, said method comprising the steps of:
  securing an intermediate adapter to a Z-axis spindle of a drive mechanism having three-axis orthogonal coordinates constituted by X, Y and Z orthogonal axes; and
  detachably mounting a mounting shaft associated with said detecting sensor to said intermediate adapter.

13. In a method according to claim 12 for detachably mounting a non-contact type detecting sensor to a three-dimensional measurement apparatus, said step of detachably mounting said mounting shaft to said intermediate adapter further comprising the steps of:
  inserting a portion of said mounting shaft which is surrounded by a cylindrical external periphery thereof into a portion of said intermediate adapter which is surrounded by a cylindrical internal periphery thereof, at an angular position at which securing pieces formed at one of said intermediate adapter and said mounting shaft do not interfere with rims formed at the other;
  temporarily securing said mounting shaft to said intermediate adapter by rotating said mounting shaft with respect to said intermediate adapter about the axis of said Z-axis spindle to a point at which a reference pin fixed to said mounting shaft comes into contact with a first reference surface of said intermediate adapter;
  inserting a positioning block between said reference pin and a second reference surface of said intermediate adapter and securing said positioning block to said mounting shaft; and
  screwing a detachable nut onto an externally threaded portion of said intermediate adapter to a point at which a flange portion of said mounting shaft comes into contact with a bottom surface of said intermediate adapter.

14. A method according to claim 12, wherein said probe type detecting sensor is detachably mounted to said mounting shaft by means of a bolt.

* * * * *